(12) United States Patent
Wang

(10) Patent No.: US 8,940,827 B2
(45) Date of Patent: *Jan. 27, 2015

(54) THERMOSETTING POLYMER-BASED COMPOSITE MATERIALS

(75) Inventor: Xiujun Wang, Acton, MA (US)

(73) Assignee: Globe Composite Solutions, Ltd., Rockland, MA (US)

( * ) Notice: Subject to any disclaimer, the term of this patent is extended or adjusted under 35 U.S.C. 154(b) by 362 days.

This patent is subject to a terminal disclaimer.

(21) Appl. No.: 12/570,537

(22) Filed: Sep. 30, 2009

(65) Prior Publication Data

US 2010/0072662 A1 Mar. 25, 2010

Related U.S. Application Data

(63) Continuation-in-part of application No. 12/357,644, filed on Jan. 22, 2009.

(60) Provisional application No. 61/022,611, filed on Jan. 22, 2008.

(51) Int. Cl.
| | |
|---|---|
| *C08K 3/08* | (2006.01) |
| *C08J 3/205* | (2006.01) |
| *C08J 5/10* | (2006.01) |
| *C08K 3/22* | (2006.01) |

(52) U.S. Cl.
CPC . *C08K 3/08* (2013.01); *C08J 3/205* (2013.01); *C08J 5/10* (2013.01); *C08K 3/22* (2013.01); *C08K 2201/014* (2013.01); *C08K 2201/019* (2013.01)
USPC .......... 524/423; 264/241; 264/681; 524/439; 524/440; 523/457; 523/458; 523/445

(58) Field of Classification Search
CPC .................................. C08J 3/205; C08K 3/08
USPC ....................................................... 524/423
See application file for complete search history.

(56) References Cited

U.S. PATENT DOCUMENTS

| | | | |
|---|---|---|---|
| 4,938,233 A | 7/1990 | Orrison, Jr. | |
| 5,245,195 A * | 9/1993 | Shah et al. ................. | 250/515.1 |
| 5,548,125 A | 8/1996 | Sandbank | |
| 5,719,352 A | 2/1998 | Griffin | |
| 6,048,379 A * | 4/2000 | Bray et al. ....................... | 75/229 |
| 6,153,666 A | 11/2000 | Lagace | |
| 6,284,817 B1 | 9/2001 | Cross et al. | |
| 6,310,355 B1 | 10/2001 | Cadwalader | |
| 6,517,774 B1 | 2/2003 | Bray et al. | |
| 6,583,432 B2 | 6/2003 | Featherby et al. | |
| 6,740,260 B2 | 5/2004 | McCord | |
| 6,815,066 B2 | 11/2004 | Elliot | |
| 6,841,791 B2 | 1/2005 | DeMeo et al. | |
| 6,967,343 B2 | 11/2005 | Batten et al. | |
| 7,740,682 B2 | 6/2010 | Ragan et al. | |
| 2003/0119989 A1 | 6/2003 | Ladd et al. | |
| 2003/0192448 A1 | 10/2003 | LeaSure | |
| 2004/0029998 A1* | 2/2004 | Tomita et al. ................. | 523/136 |
| 2004/0079904 A1 | 4/2004 | Batten et al. | |
| 2004/0124374 A1* | 7/2004 | Joseph ....................... | 250/507.1 |
| 2005/0004268 A1 | 1/2005 | Lynch | |
| 2005/0064223 A1 | 3/2005 | Bavaro et al. | |
| 2005/0211930 A1* | 9/2005 | DeMeo et al. ............. | 250/516.1 |
| 2005/0258404 A1 | 11/2005 | McCord | |
| 2006/0255299 A1 | 11/2006 | Edwards et al. | |
| 2007/0017160 A1 | 1/2007 | Caldwell et al. | |
| 2007/0051634 A1 | 3/2007 | Poole et al. | |
| 2007/0145294 A1 | 6/2007 | McCord | |
| 2007/0148470 A1 | 6/2007 | Mallozzi et al. | |

FOREIGN PATENT DOCUMENTS

| | | |
|---|---|---|
| EP | 0371699 A1 | 6/1990 |
| GB | 2004289 | 3/1979 |
| WO | 2004052974 | 6/2004 |
| WO | 2005017556 A2 | 2/2005 |
| WO | 2009020948 | 2/2009 |
| WO | 2009094419 A1 | 7/2009 |

OTHER PUBLICATIONS

International Search Report for PCT/US2009/031654, dated Jun. 26, 2009.
Hexion EPON 8111 Technical Data Sheet, 2001.
Dow Chemical Product Information: D.E.N. 438.
Communication issued in corresponding European Patent Application No. 09 704 237.8 mailed on Dec. 17, 2012.

* cited by examiner

*Primary Examiner* — Doris Lee
(74) *Attorney, Agent, or Firm* — MKG, LLC

(57) ABSTRACT

The present invention relates to a lead-free, non-toxic and arc resistant composite material having a thermosetting polymer, at least one heavy particulate filler, at least one light particulate filler and, optionally, at least one arc resistant filler. The composite material may be utilized in manufacturing articles used in radiation shielding and other applications where arc resistant and dielectric strength are desired.

30 Claims, No Drawings

THERMOSETTING POLYMER-BASED COMPOSITE MATERIALS

CROSS-REFERENCE TO RELATED APPLICATION

This application is a continuation-in-part application of U.S. patent application Ser. No. 12/357,644, filed Jan. 22, 2009, entitled "Thermosetting Polymer-Based Composite Materials," which is hereby incorporated by reference in its entirety. This application is also related to U.S. Provisional Patent Application Ser. No. 61/022,611 filed Jan. 22, 2008, which is hereby incorporated by reference in its entirety.

FIELD OF THE INVENTION

The disclosed subject matter relates to thermosetting polymer-based composite materials. More specifically, the disclosed subject matter relates to lead-free, non-toxic thermosetting polymer-based composite materials, which may be used in radiation shielding, weight-balancing, ballast, or energy storage applications.

BACKGROUND OF THE INVENTION

Lead has been used in many industries for decades. For instance, lead is widely used for radiation shielding applications due to its efficiency and low cost. While efficient and low-cost, lead has been found to be toxic to animals, and particularly toxic to humans.

In response to the desire to reduce toxicity or the use of toxic compounds, and in order to comply with state, federal, and international regulations regarding the use, transport, and disposal of lead and lead-containing composite materials, numerous lead substitutes and lead-free composite materials have been developed as replacements for lead or lead-filled composite materials. Lead substitutes and lead-free composite materials can be used in a variety of applications including, but not limited to, ammunition, construction, and radiation shielding applications.

While lead-free composite materials developed for use in radiation shielding applications thus far may offer the benefit of reduced or no toxicity, lead-free composite materials containing certain fillers in certain amounts detrimentally affect the composite material. For example, at certain levels of filler content, viscosity becomes so high that the ability to cast the material is reduced or lost completely. Some fillers also detrimentally affect the resistance to arcing and/or the dielectric strength of the composite material. A lead-free, non-toxic composite material having suitable dielectric strength and arc resistance properties and being efficient in radiation protection, economical to make and use as well as easily handled and castable or processed by other methods, such as liquid phase sintering, is desired.

SUMMARY OF THE INVENTION

One aspect of the disclosed subject matter relates to a lead-free, non-toxic composite material. This composite material comprises a thermosetting polymer; at least one filler selected from a first group consisting of heavy particulate fillers; at least one filler selected from a second group consisting of light particulate fillers; wherein the thermosetting polymer includes one selected from epoxy resins, urethane prepolymers, phenolics, silicones, unsaturated esters, vinyl esters and melamines; wherein the heavy particulate filler is selected from a first group consisting of tungsten, osmium, uranium, iridium, platinum, gold, molybdenum, tantalum, hafnium, thallium, palladium, ruthenium, rhodium, silver and combinations thereof; wherein the light particulate filler is selected from a second group consisting of barium, barium sulfate, barium carbonate, barium hydroxide, barium oxide, tin, tin oxide, tin dioxide, bismuth, bismuth oxide, copper, copper oxide, iodine, zirconium, zirconium dioxide, nickel, nickel oxide, and combinations thereof.

Another aspect relates to a lead-free, non-toxic article comprising a lead-free, non-toxic composite material. This composite material comprises a thermosetting polymer; at least one filler selected from the first group consisting of heavy particulate fillers, and at least one filler selected from the second group consisting of light particulate fillers; wherein the thermosetting polymer includes one selected from epoxy resins, urethane prepolymers, phenolics, silicones, unsaturated esters, vinyl esters and melamines; wherein the heavy particulate filler is selected from the first group consisting of tungsten, osmium, uranium, iridium, platinum, gold, molybdenum, tantalum, hafnium, thallium, palladium, ruthenium, rhodium, silver and combinations thereof and further wherein the light particulate filler is selected from the second group consisting of barium, barium sulfate, barium carbonate, barium hydroxide, barium oxide, tin, tin oxide, tin dioxide, bismuth, bismuth oxide, copper, copper oxide, iodine, zirconium, zirconium dioxide, nickel, nickel oxide, and combinations thereof.

Another aspect relates to a method of dispensing and/or manufacturing lead-free, non-toxic radiation shielding devices, such as radiation shielding devices for radioactive isotopes of Xenon, Xe-133, Technetium, Tc-99m, Gallium Citrate, Ga-67, Samarium, Sm-153, Thallium Chloride, TI-201 and the like. This method comprises combining a liquid thermosetting polymer, at least one filler selected from the first group consisting of heavy particulate fillers, and at least one filler selected from the second group consisting of light particulate fillers to form a lead-free, non-toxic composite material, wherein the thermosetting polymer includes one selected from epoxy resins, urethane prepolymers, phenolics, silicones, unsaturated esters, vinyl esters and melamines; wherein the heavy particulate filler is selected from the first group consisting of tungsten, osmium, uranium, iridium, platinum, gold, molybdenum, tantalum, hafnium, thallium, palladium, ruthenium, rhodium, silver and combinations thereof; and wherein said light particulate filler is selected from the group consisting of barium, barium sulfate, barium carbonate, barium hydroxide, barium oxide, tin, tin oxide, tin dioxide, bismuth, bismuth oxide, copper, copper oxide, iodine, zirconium, zirconium dioxide, nickel, nickel oxide, and combinations thereof; and casting the lead-free, non-toxic composite material to form a lead-free, non-toxic article.

Another aspect relates to a method of manufacturing a lead-free, non-toxic X-ray and/or Gamma-ray radiation shielding device exhibiting arc resistance and suitable dielectric strength. This method comprises combining a liquid thermosetting polymer, at least one filler selected from the first group consisting of heavy particulate fillers, at least one filler selected from the second group consisting of light particulate fillers, at least one filler selected from the third group consisting of arc resistant fillers and combinations thereof to form a lead-free, non-toxic, and arc resistant composite material, wherein the heavy particulate filler is selected from the first group consisting of tungsten, osmium, uranium, iridium, platinum, gold, molybdenum, tantalum, hafnium, thallium, palladium, ruthenium, rhodium, silver; wherein the light particulate filler is selected from the second group consisting of barium, barium sulfate, barium carbonate, barium hydroxide, barium oxide, tin, tin oxide, tin dioxide, bismuth, bismuth oxide, copper, copper oxide, iodine, zirconium, zirconium dioxide, nickel, nickel oxide, and combinations thereof; and further wherein the arc resistant filler is selected from the group consisting of boron nitride, boron oxide, zinc oxide, aluminum oxide, titanium oxide, magnesium oxide, iron oxide and combinations thereof; and casting the lead-free, non-toxic composite material to form a lead-free, non-toxic and arc resistant X-ray and/or Gamma ray radiation shielding device.

Yet a further aspect relates to a method of manufacturing a lead-free, non-toxic radiation shielding device, such as radiation shielding devices for radioactive isotopes of zenon, Xe-133, Technetium, Tc-99m, Gallium Citrate, Ga-67, Samarium, Sm-153, Thallium Chloride, Tl-201 and the like. This method comprises combining a solid thermosetting polymer, at least one heavy particulate filler and at least one light particulate and combinations thereof to form a lead-free, non-toxic composite material, wherein the heavy particulate filler is selected from a group consisting of tungsten, osmium, uranium, iridium, platinum, gold, molybdenum, tantalum, hafnium, thallium, palladium, ruthenium, rhodium, silver and combinations thereof and further wherein said light particulate filler is selected from the group consisting of barium, barium sulfate, barium carbonate, barium hydroxide, barium oxide, tin, tin oxide, tin dioxide, bismuth, bismuth oxide, copper, copper oxide, iodine, zirconium, zirconium dioxide, nickel, nickel oxide, and combinations thereof; and a liquid phase sintering process the lead-free, non-toxic composite material to form a lead-free, non-toxic radiation shielding article.

Yet a further aspect relates to a method of manufacturing a lead-free, non-toxic radiation X-ray and/or Gamma ray shielding device in which arc resistance and dielectric strength are important. This method comprises combining a solid thermosetting polymer, at least one heavy particulate filler, at least one light particulate, and at least one arc resistant filler and combinations thereof to form a lead-free, non-toxic composite material, wherein the heavy particulate filler is selected from the first group consisting of tungsten, osmium, uranium, iridium, platinum, gold, molybdenum, tantalum, and combinations thereof; wherein the light particulate filler is selected from the second group consisting of barium, barium sulfate, barium carbonate, barium hydroxide, barium oxide, tin, tin oxide, tin dioxide, bismuth, bismuth oxide, copper, copper oxide, iodine, zirconium, zirconium dioxide, nickel, nickel oxide, and combinations thereof; and wherein the arc resistant filler is selected from the group consisting of boron nitride, boron oxide, zinc oxide, aluminum oxide, titanium oxide, magnesium oxide, iron oxide and combinations thereof; and the liquid phase sintering process, the lead-free, non-toxic composite material to form a lead-free, non-toxic and arc resistant X-ray and/or Gamma ray article.

Yet a further aspect relates to a lead-free, non-toxic composite material, the composite material comprising a thermosetting polymer; a heavy particulate filler comprising a metal; and a light particulate filler, the light particulate filler having a specific gravity that is less than a specific gravity of the heavy particulate filler.

A further aspect relates to a lead-free, non-toxic composite material. This composite material comprises a thermosetting polymer; a heavy particulate filler comprising a metal; a light particulate filler, the light particulate filler having a specific gravity that is less than a specific gravity of the heavy particulate filler; and an arc resistant filler comprising at least one of a metal nitride, a metalloid nitride, a metal oxide, and a metalloid oxide.

A lead-free, non-toxic composite material may also, more specifically, comprise an epoxy resin; a heavy particulate filler comprising tungsten; a light particulate filler comprising barium sulfate; and an arc resistant filler comprising at least one of a metal nitride, and a metalloid nitride, a metal oxide, and a metalloid oxide.

A further aspect relates to a method of manufacturing a lead-free, non-toxic radioactive isotope radiation shielding device. This method comprises the steps of combining a liquid thermosetting polymer, at least one heavy particulate filler selected from a first group consisting of heavy particulate fillers, and at least one light particulate filler selected from a second group consisting of light particulate fillers and combinations thereof to form a lead-free, non-toxic composite material; and casting the lead-free, non-toxic composite material to form a lead-free, non-toxic article.

Still another aspect relates to a method of manufacturing a lead-free, non-toxic radioactive isotope radiation shielding device, this method comprising the steps of combining a solid thermosetting polymer, at least one heavy particulate filler selected from a first group consisting of heavy particulate fillers, and at least one light particulate filler selected from a second group consisting of light particulate fillers and combinations thereof to form a lead-free, non-toxic composite material; and liquid phase sintering the lead-free, non-toxic composite material to form a lead-free, non-toxic article.

The present invention provides high density composite compositions that may be used for replacement of lead or lead filled composite materials for other applications which include, but are not limited to, counterweights, acoustic dampening materials, energy storage, and the like.

The present invention also provides an efficient means of improving arc resistance, dielectric strength, dielectric constant, dissipation factor, and electrical resistivity for composite materials comprising tungsten element powder and a thermoplastic resin as a binder, which includes, not limited to, polyamide, polyester, polyethylene, polypropylene, poly-1-butene, polyisobutylene, polystyrene, acrylonitrile-butadiene-styrene block copolymer, polyvinyl chloride, polyurethane, polyurea, ethylene-vinyl acetate copolymer, ethylene-propylene copolymer, ionomer, fluoro-polymer, polysulfone, polyphenylene oxide, polycarbonate, acetal, polyphenylene sulfide, polyacrylate, polyetherimide, polyetheretherketone, polyimide, polyamideimide and the like.

The above described and other features are exemplified by the following detailed description.

DETAILED DESCRIPTION

One embodiment of the disclosed composite material includes a thermosetting polymer, at least one heavy particulate filler selected from the first group consisting of heavy particulate fillers and at least one light particulate filler selected from the second group consisting of light particulate fillers or a combination thereof. The terms "heavy" and "light" refer to the specific gravity of the particulate fillers. In general, heavy particulate filler has a higher relative specific gravity than a light particulate filler.

Another embodiment of the disclosed composite material includes a thermosetting polymer, at least one heavy particulate filler selected from the first group consisting of heavy particulate fillers, at least one light particulate filler selected from the second group consisting of light particulate fillers, and at least one arc resistant filler selected from the third group consisting of arc resistant fillers or combinations thereof.

In a particular embodiment, the composite material comprises tungsten powder, barium sulfate powder, and an epoxy resin as a binder.

In another embodiment, the composite material comprises tungsten powder, barium sulfate powder, boron nitride powder, and an epoxy resin as a binder.

In another embodiment, the composite material comprises tungsten powder, barium sulfate powder, zinc oxide powder, and an epoxy resin as a binder.

In another embodiment, the composite material comprises tungsten powder, barium sulfate powder, boron nitride powder and zinc oxide powder, and an epoxy resin as a binder.

A novel aspect of the present invention is the use of a dual-filler composite composition, which may be used in the fabrication of an article such as a radiation shield device or a radiation shield container. One exemplary dual-filler composition consists of tungsten powder and barium sulfate powder. Tungsten has a specific gravity of 19.35, barium sulfate's specific gravity is 4.5, and the specific gravity of liquid epoxy resin before being cured (solid) is about 1.1 to about 1.2. When tungsten powder alone is added to a liquid epoxy resin, tungsten has a tendency to settle in the liquid epoxy resin due to differences between the specific gravities of tungsten and the liquid epoxy resin. As a result, the formed article may have a different density distribution. For example, a top portion of the article may have a lower specific gravity than a bottom portion of the same article. Subsequently, the article will exhibit different performance aspects from the top to the bottom of the article.

There are several advantages for the dual-filler compositions. First, barium sulfate desirably helps reduce the tendency for tungsten powder to settle when it is introduced into the above compositions. This is primarily because barium sulfate has a lower specific gravity, a greater specific surface area (surface area/gram), and a higher aspect ratio (length/diameter) than tungsten. Barium sulfate powder also affects rheological properties of the composite compositions. As a result, the use of barium sulfate can modify rheological properties/viscosities of the composite composition, reduce settling of tungsten powder, and make cured articles with more uniform distribution of density.

Second, barium sulfate has suitable radiation-blocking material due to the fact that barium has a relatively large atomic number, 56.

Third, barium sulfate has a higher value of electrical resistivity than tungsten, so that barium sulfate provides improved dielectrical strength and arc resistance.

Furthermore, the use of barium sulfate provides a suitable means to control the composite material's specific gravities, particularly for specific gravities less than 3.00.

Additionally, barium sulfate is a cost-effective radiation shielding material. Tungsten is relatively expensive. It is advantageous to use barium sulfate in the composite compositions to reduce the overall material cost.

The composite material may be lead-free, non-toxic, and possess radiation shielding capabilities covering a broad range of radioactive isotope radiation shielding levels from 80 KeV for Xe-133 up to 320 KeV for Ga-67. The intermediate radiation shielding levels include 100 KeV for Sm-153, and 160 KeV for Tc-99m.

The composite material may also be lead-free, non-toxic, and possess radiation shielding covering X-ray and Gamma-ray radiation shielding levels from as low as 5 peak kilovolt (5 kVp) to as high as about 300 peak kilovolt (300 kVp) when the composite material is used to structure X-ray and Gamma-ray devices or containers.

Another novel aspect of the present invention is the development of the arc resistant composite compositions which are applicable for creating X-ray and Gamma-ray shielding devices where arc resistance and dielectric strength are desired. One of the compositions consists of tungsten powder, barium sulfate powder, and boron nitride powder or zinc oxide or the combination of the two, where boron nitride powder or zinc oxide or the combination of the two improves the arc resistance.

Table 1 below shows comparison of dielectric strength of three composite materials that have approximately the same specific gravity. Sample 1 is filled with barium sulfate powder, and Sample 2 is filled with 30% wt tungsten powder and 45% wt barium sulfate powder. Sample 3 is filled with lead and lead tetraoxide powder. For all of the three composite materials, epoxy resin is used as a binder material.

TABLE 1

Comparison of dielectric strength

| Sample | Specific gravity | Total filler wt % | Individual filler wt % | Dielectric strength, V/mil |
|---|---|---|---|---|
| 1 | 2.6 | 75% wt | 75% wt barium sulfate | 384 |
| 2 | 3.0 | 75% wt | 30% wt tungsten & 45% wt barium sulfate | 130 |
| 3 | 2.92 | n/a | Lead & lead tetraoxide | 299 |

Table 1 indicates that the barium sulfate filled composite material (Sample 1) has desirable dielectric strength. This is why barium sulfate is used in the dual-filler compositions. The dielectric strength tests were carried out according to ASTM D 149-97a Method A by Plastics Technology Laboratories, Pittsfield, Mass.

Table 2 below shows a comparison of arc resistance of two composite materials that have approximately the same specific gravity, one of which is filled with tungsten powder and barium sulfate powder and the other of which is filled with tungsten powder, barium sulfate powder, and zinc oxide powder. For both composite materials, epoxy resin is used as a binder material.

TABLE 2

Comparison of arc resistance

| Sample | Specific gravity | Total filler content | Individual filler content | Arc resistance per ASTM D 497 |
|---|---|---|---|---|
| 4 | 3.635 | 77.28% wt | 50% wt tungsten 27.5% wt barium sulfate | 23 seconds |
| 5 | 3.4 | 78.0% wt | 39% wt tungsten 22% % wt barium sulfate 17.5% wt zinc oxide | 146 seconds |

Table 2 demonstrates that substitution of 11% wt tungsten powder and 5.5 wt % barium sulfate with zinc oxide powder substantially improves arc resistance of the composite material while maintain the same specific gravity and radiation shielding capacity. The arc resistance tests were carried out according to ASTM D 495 & UL 746A High Voltage, Low Current, Dry Arc Resistance by ELTEK International Laboratories, St. Charles, Mo.

Table 3 below shows a comparison of arc resistance of three composite materials that have approximately the same specific gravity, one of which is filled with tungsten powder and barium sulfate powder; the second of which is filled with tungsten powder, barium sulfate powder, and zinc oxide powder; and third of which is filled with tungsten powder, barium sulfate powder, and the combination of zinc oxide powder and boron nitride powder.

TABLE 3

Comparison of arc resistance

| Sample | Specific gravity | Total filler content | Individual filler content | Arc resistance per ASTM D 495 |
|---|---|---|---|---|
| 4 | 3.635 | 77.50% wt | 50% wt tungsten & 27.5% wt barium sulfate | 23 seconds |
| 6 | 3.4 | 78.5% wt | 39% wt tungsten 22% % wt barium sulfate 17.5% wt zinc oxide | 146 seconds |
| 5 | 3.4 | 79.0% wt | 40% wt tungsten 22% % wt barium sulfate 14.5% wt zinc oxide 2.5% wt boron nitride | 182 seconds |

It is apparent that substituting 2.5 wt % zinc oxide powder with boron nitride powder further improves arc resistance of the composite material by about 25%. The arc resistance tests were carried out according to ASTM D 495 & UL 746A High Voltage, Low Current, Dry Arc Resistance by ELTEK International Laboratories, St. Charles, Mo.

As was discovered, two composite materials having approximately the same specific gravity may have equivalent radiation shielding performance when exposed to a relatively low radiation energy level, such as a 76 kVp X-ray radiation source. Therefore, to shield a relatively low level of radiation energy, it may be advantageous to use a lower amount of tungsten and greater amount of barium sulfate along with an arc resistant filler to produce a composite material with approximately the same specific gravity. This is one method of increasing arc resistance.

Furthermore, the composite material may have a high specific gravity. The specific gravity may be between, for example, 1.5 and 12. In one example, the composite material may have a specific gravity between 1.5 and 3.0. In another example, the composite material may have a specific gravity between 3.0 and 6.0. In yet a further example, the composite material may have a specific gravity between 3.0 and 5.0. In yet another example, the composite material may have a specific gravity between 2.5 and 6.0. In a further example, the composite material may have a specific gravity between 2.0 and 4.5. In yet another example, the composite material may have a specific gravity between 2.5 and 12.

It has been found that the rate of radiation transmission passing through a composite material is reduced inversely to the density of the composite material. The composite material may be used in a variety of manners and applications, including, but not limited to, being cast as a radiation shield device or a radiation shield container, and as a radiation shield, applied to objects as a shielding layer, such as garments or applied to objects, such as a coating.

The thermosetting polymer may be any thermosetting polymer known in the art. Thermosetting polymers in composite materials are often referred to as a matrix or a binder. Examples of thermosetting polymers include polymer materials that irreversibly cure to a stronger form. The cure may be accomplished through heat (generally at around 200 degrees Celsius), through a chemical reaction (two-part epoxy, for example), or irradiation such as electron beam processing. Specific examples of thermosetting polymers include, but are not limited to, epoxy resins, urethane prepolymers, phenolics, silicones, unsaturated esters, vinyl esters, melamines, and combinations thereof.

In one example of the composite material, the thermosetting polymer is an epoxy resin. The epoxy resin may be in liquid or solid form. If in liquid form, the composite material is able to be poured or cast by a casting technique. If, however, the epoxy resin is in solid form, the composite material may be processed by a liquid phase sintering process, where the thermosetting polymer, premixed with the fillers, is melted, pressurized, and followed by a curing process.

The epoxy resin used in the composite material may have an epoxide equivalent weight in the range of 100 to 590, and a viscosity in the range of 40 poises to 250 poises. In another example, the epoxy resin has a viscosity in the range of 60 poises to 200 poises. In yet another example, the viscosity of the epoxy resin is between 80 poises to 170 poises.

In one example, the epoxy resin has low molecular weight. The epoxy resin may also have outstanding resistance to pigment and filler settling. Resistance to pigment and filler settling allow for a uniform dispersion of the fillers and pigments present in the composite material. The epoxy resin may also have superior resistance to foaming under vacuum. Specific examples of liquid epoxy resins include, but are not limited to the diglycidyl ether of Bisphenol A, available as Epon™ 8280 epoxy resin and the diglycidyl ether of Bisphenol F, which is available as Epon™ 862 epoxy resin, both available from Hexion Specialty Chemicals, Columbus, Ohio, United States. A specific example of a solid epoxy resin is the diglycidyl ether of Bisphenol A Epon™ 3002, also available from Hexion Specialty Chemicals, Columbus, Ohio, United States.

In one example, the composite material includes between 0.5% and 50% by weight of epoxy resin, based on the weight of the composite material. In another example, the composite material includes between 10% and 50% by weight of epoxy resin, based on the weight of the composite material. In yet a further example, the composite material includes between 0.5% and 30% by weight of epoxy resin, based on the weight of the composite material.

In another example of the composite material, the thermosetting polymer is a urethane. Typically, the urethane is in liquid form, thereby allowing the composite material to be pourable or castable. The urethane may be a low viscosity urethane. In yet another example of the composite material, the thermosetting polymer is a urethane prepolymer having a pot life greater than 5 minutes. In another example, the pot life of the urethane prepolymer has a pot life greater than 10 minutes.

A specific example of a urethane is a reaction product of polyether with toluene diisocyanate, available as Adiprene® L100 and Adiprene® L42 from Chemtura Corporation, Middlebury, Conn., United States.

In one example, the lead-free, non-toxic composite material includes between 0.5% and 50% by weight of the thermosetting polymer, based on the weight of the composite material. In another example, the composite material includes between 0.5% and 40% by weight of the thermosetting polymer, based on the weight of the composite material. In yet another example, the composite material includes between 0.5% and 35% by weight of the thermosetting polymer, based on the weight of the composite material. In a further example, the composite material includes between 0.5% and 30% by weight of the thermosetting polymer, based on the weight of the composite material. In yet a further example, the composite material includes between 0.5% and 25% by weight of the thermosetting polymer, based on the weight of the composite material. In yet another example, the composite material includes between 0.5% and 20% by weight of the thermosetting polymer, based on the weight of the composite material. In yet a further example, the composite material includes between 10% and 30% by weight of the thermosetting polymer, based on the weight of the composite material. In yet another example, the composite material includes between 10% and 25% by weight of the thermosetting polymer, based on the weight of the composite material. In a further example, the composite material includes between 10% and 20% by weight of the thermosetting polymer, based on the weight of the composite material. In yet another example, the composite material includes between 5% and 35% by weight of the thermosetting polymer, based on the weight of the composite material. In a further example, the composite material includes between 5% and 30% by weight of the thermosetting polymer, based on the weight of the composite material.

The lead-free, non-toxic composite material may also include at least one heavy particulate filler, and at least one light particulate filler or a combination thereof. Fillers are used in the composite compositions for a variety of reasons, including, but not limited to, radiation shielding, cost reduction, viscosity modification, improvement of processing, density control, altering electrical and optical properties, and control of thermal expansion, thermal conductivity, magnetic properties, flame retardancy and improvement of mechanical properties, such as impact resistance and thermal resistance.

It is contemplated that any filler may be used in the composite material described herein. The heavy particulate filler in the composite material may have a high atomic number. Examples of heavy particulate fillers include, but are not limited to tungsten, osmium, uranium, iridium, platinum, gold, molybdenum, tantalum, hafnium, thallium, palladium, ruthenium, rhodium, silver, and combinations thereof. The composite material may include one or more different heavy particulate fillers. Heavy particulate fillers utilized in the composite material may be in any form, e.g., powder form or granular form.

The composite material may contain any amount of heavy particulate filler desired. The amount of heavy particulate filler will vary depending on viscosity, processability, desired densities, desired dielectric strength, desired electric arc resistance, specific levels of radiation shield in the composite material and cost considerations.

In one example, the composite material contains between about 1% and about 99.5% by weight of the heavy particulate filler, based on the weight of the composite material.

In another example, the composite material contains between about 1% and about 95% by weight of the heavy particulate filler, based on the weight of the composite material.

In still another example, the composite material contains between about 1% and about 80% by weight of the heavy particulate filler, based on the weight of the composite material.

In still another example, the composite material contains between about 10% and about 99.5% by weight of the heavy particulate filler, based on the weight of the composite material.

In another example, the composite material contains between about 10% and about 95% by weight of the heavy particulate filler, based on the weight of the composite material.

In still another example, the composite material contains between about 10% and about 80% by weight of the heavy particulate filler, based on the weight of the composite material.

In still another example, the composite material contains between about 20% and about 99.5% by weight of the heavy particulate filler, based on the weight of the composite material.

In another example, the composite material contains between about 20% and about 95% by weight of the heavy particulate filler, based on the weight of the composite material.

In still another example, the composite material contains between about 20% and about 80% by weight of the heavy particulate filler, based on the weight of the composite material.

In still another example, the composite material contains between about 40% and about 99.5% by weight of the heavy particulate filler, based on the weight of the composite material.

In another example, the composite material contains between about 40% and about 95% by weight of the heavy particulate filler, based on the weight of the composite material.

In still another example, the composite material contains between about 40% and about 80% by weight of the heavy particulate filler, based on the weight of the composite material.

In still another example, the composite material contains between about 40% and about 70% by weight of the heavy particulate filler, based on the weight of the composite material.

In another example, the composite material contains between about 50% and about 85% by weight of the heavy particulate filler, based on the weight of the composite material.

In still another example, the composite material contains between about 50% and about 80% by weight of the heavy particulate filler, based on the weight of the composite material.

In still another example, the composite material contains about 1% to about 30% by weight of the heavy particulate filler.

In still another example, the composite material contains between about 10% and about 30% by weight of the heavy particulate filler.

In still another example, the composite material contains between about 20% and about 30% by weight of the heavy particulate filler.

Typically, the heavy particulate fillers have an average particle size between about 0.1 micron and about 200 microns. In another example, the heavy particulate fillers have an average particle size between about 0.5 micron and about 200 microns. In another example, the heavy particulate fillers have an average particle size between about 0.1 micron and about 100 microns. In a further example, the heavy particulate fillers have an average particle size between 0.5 micron and 100 microns. In yet another example, the heavy particulate filler has an average particle size between about 0.5 micron and 50 microns. In still a further example, the heavy particulate filler has an average particle size between about 1.0 micron and 15 microns.

In one example of the composite material, the heavy particulate filler is tungsten. Tungsten may be used in either granule or powder form or a combination thereof. Tungsten may be used in combination with one or more heavy particulate fillers. In another example, tungsten may be used in combination with one or more light particulate fillers. In yet a further example, tungsten may be used in combination with one or more heavy particulate fillers as well as in combination with one or more light particulate fillers. In yet a further example, tungsten may be used in combination with one or more heavy particulate fillers, with one or more light particulate fillers as well as in combination with one or more arc resistant fillers.

Examples of light particulate fillers include, but are not limited to fillers having a relatively high atomic number. Specific examples of light particulate fillers include, but are not limited to, barium, barium sulfate, barium carbonate, barium hydroxide, barium oxide, tin, tin oxide, tin dioxide, bismuth, bismuth oxide, copper, copper oxide, iodine, zirconium, zirconium dioxide, nickel, nickel oxide, and combinations thereof. It is contemplated that the composite material may contain one or more different light particulate fillers.

The composite material may contain any amount of light particulate fillers desired. The amount of light particulate filler will vary depending on viscosity, processability, desired densities, desired dielectric strength, desired electric arc resistance, specific levels of radiation shield in the composite material and cost considerations.

In one example, the composite material contains between about 1% and about 99.5% by weight of the light particulate filler, based on the weight of the composite material.

In another example, the composite material contains between about 1% and about 95% by weight of the light particulate filler, based on the weight of the composite material.

In still another example, the composite material contains between about 1% and about 80% by weight of the light particulate filler, based on the weight of the composite material.

In still another example, the composite material contains between about 10% and about 99.5% by weight of the light particulate filler, based on the weight of the composite material.

In another example, the composite material contains between about 10% and about 95% by weight of the light particulate filler, based on the weight of the composite material.

In still another example, the composite material contains between about 10% and about 80% by weight of the light particulate filler, based on the weight of the composite material.

In still another example, the composite material contains between about 20% and about 99.5% by weight of the light particulate filler, based on the weight of the composite material.

In another example, the composite material contains between about 20% and about 95% by weight of the light particulate filler, based on the weight of the composite material.

In still another example, the composite material contains between about 20% and about 80% by weight of the light particulate filler, based on the weight of the composite material.

In still another example, the composite material contains between about 40% and about 99.5% by weight of the light particulate filler, based on the weight of the composite material.

In another example, the composite material contains between about 40% and about 95% by weight of the light particulate filler, based on the weight of the composite material.

In still another example, the composite material contains between about 40% and about 80% by weight of the light particulate filler, based on the weight of the composite material.

In still another example, the composite material contains between about 40% and about 70% by weight of the light particulate filler, based on the weight of the composite material.

In another example, the composite material contains between about 50% and about 85% by weight of the light particulate filler, based on the weight of the composite material.

In yet another example, the composite material contains between about 50% and about 80% by weight of the light particulate filler, based on the weight of the composite material.

Typically, the light particulate fillers have an average particle size between about 0.5 micron and about 200 microns. In another example, the light particulate fillers have an average particle size between about 0.5 micron and about 100 microns. In yet a further example, the light particulate fillers have an average particle size between about 0.5 micron and about 50 microns. In still a further example, the light particulate fillers have an average particle size between about 1.0 micron and about 15 microns.

In one example of the composite material, the light particulate filler is barium sulfate. Barium sulfate may be used in either granule or powder form or a combination thereof. Barium sulfate may be used alone or in combination with one or more light particulate fillers. In another example, barium sulfate may be used in combination with one or more heavy particulate fillers, a specific example being barium sulfate used in combination with tungsten. In yet a further example, barium sulfate may be used in combination with one or more light particulate fillers, with one or more heavy particulate fillers as well as in combination with one or more arc resistant fillers.

In one embodiment, the composite material includes a thermosetting polymer, a heavy particulate filler and a light particulate filler. The light particulate filler may inhibit the settling of the heavy particulate fillers. In one example, the heavy particulate filler and the light particulate filler have different particle sizes. In another example, both the heavy particulate filler and the light particulate filler have the same size particles. In one example, both the heavy particulate filler and the light particulate filler have particles between 0.5 micron and 15 microns in size.

The weight ratio of heavy particulate filler to light particulate filler present in the composite material will vary between materials and between applications the material is used in. In one example, the weight ratio of heavy particulate filler to light particulate filler is in a range from about 1:80 to about 99.5:1. In another example, the weight ratio of heavy particulate filler to light particulate filler is in a range from about 20:60 to about 99.5:1. In yet another example, the weight ratio of heavy particulate filler to light particulate filler is in a range from about 30:45 to about 99.5:1. In another example, the weight ratio of heavy particulate filler to light particulate filler is in a range from about 45:30 to about 99.5:1. In another example, the weight ratio of heavy particulate filler to light particulate filler is in a range from about 55:20 to about 99.5:1. In another example, the weight ratio of heavy particulate filler to light particulate filler is in a range from about 60:15 to about 99.5:1. In another example, the weight ratio of heavy particulate filler to light particulate filler is in a range from about 64:16 to about 99.5:1. In yet another example, the weight ratio of heavy particulate filler to light particulate filler is in a range from about 72:8 to about 99.5:1. In a specific example, the weight ratio of heavy particulate filler to light particulate filler is 1:80. In another specific example, the weight ratio of heavy particulate filler to light particulate filler is 20:60. In a further example, the weight ratio of heavy particulate filler to light particulate filler is 30:45. In still another example, the weight ratio of heavy particulate filler to light particulate filler is 45:30. In another example, the weight ratio of heavy particulate filler to light particulate filler is 55:20. In yet another example, the weight ratio of heavy particulate filler to light particulate filler is 60:15. In yet another example, the weight ratio of heavy particulate filler to light particulate filler is 64:16. In another example, the weight ratio of heavy particulate filler to light particulate filler is 72:8. In still a further example, the weight ratio of heavy particulate filler to light particulate filler is 80:1. In another specific example, the weight ratio of heavy particulate filler to light particulate filler is 82:1. In a further specific example, the weight ratio of heavy particulate filler to light particulate filler is 86:1. In another specific example, the weight ratio of heavy particulate filler to light particulate filler is 90:1. In a further specific example, the weight ratio of heavy particulate filler to light particulate filler is 95:1. In still a further example, the weight ratio of heavy particulate filler to light particulate filler is 99.5:1.

In one embodiment, the composite material includes a thermosetting polymer, a heavy particulate filler, a light particulate filler and an arc resistant filler. The arc resistant filler may further improve dielectric strength and arc resistance. In one example, the arc resistant filler, the heavy particulate filler and the light particulate filler have different particle sizes. In another example, all of the arc resistant filler, the heavy particulate filler and the light particulate filler have the same size particles. In one example, all of the arc resistant filler, the heavy particulate filler, and the light particulate filler have particles between 0.1 micron and 15 microns in size. In particular embodiments, the arc resistant filler comprises between about 0.5% wt and about 70% wt of the composite materials. In other embodiments, the arc resistant filler comprises between about 5% wt and about 60% wt of the composite materials. In other embodiments, the arc resistant filler comprises between about 10% wt and about 50% wt of the composite materials. In other embodiments, the arc resistant filler comprises between about 20% wt and about 40% wt of the composite materials. In other embodiments, the arc resistant filler comprises between about 20% wt and about 30% wt of the composite materials. Of course these are exemplary percentages and the arc resistant filler may comprise any percentages between these figures, for example, about 1.5% wt, 3% wt, 5.5% wt, 12% wt, 15% wt, 18% wt, 22% wt, 25% wt, 27% wt, 31% wt, 34% wt, 36% wt, 41% wt, 44% wt, 47% wt, 51% wt, 54% wt, 56% wt of the composite materials.

In one embodiment, the composite material includes a heavy particulate filler, such as tungsten, a light particulate filler, such as barium sulfate, and an arc resistant filler, such as boron nitride; wherein the composite material has a lower level radiation shielding ranging from about 5 kV to about 50 kV. In another embodiment, the composite material includes a combination of a heavy particulate filler, such as tungsten, a light particulate filler, such as barium sulfate and an arc resistant filler, such as, boron nitride or zinc oxide or a combination of the two to produce an intermediate density composite material that targets levels of radiation energy ranging from 50 kV to about 140 kV.

In yet another embodiment, the composite material includes a combination of a heavy particulate filler, for example, tungsten, a light particulate filler, for example, barium sulfate and an arc resistant filler, for example, boron nitride or zinc oxide or a combination of the two, but have different weight ratios to produce a high density composite material that targets high levels of radiation energy ranging from 140 kV to about 300 kV.

In yet another embodiment, the composite material comprises at least one thermosetting polymer, at least one heavy particular filler, and at least one light particulate filler. This composite material can be used to manufacture any suitable article such as a lead-free, non-toxic, radiation shielding device. The thermosetting polymer is present in an amount of about 0.5 wt. % to about 50 wt. % based on the total weight of the composite material and is selected from the group consisting of epoxy resins, urethane prepolymers, phenolics, silicones, unsaturated esters, vinyl esters, melamines, and combinations thereof. The heavy particulate filler is a metal selected from the group consisting of tungsten, osmium, uranium, iridium, platinum, gold, molybdenum, tantalum, hafnium, thallium, palladium, ruthenium, rhodium, silver, and combinations of the foregoing materials. The light particulate filler is selected from the group consisting of barium, barium sulfate, barium carbonate, barium hydroxide, barium oxide, tin, tin oxide, tin dioxide, bismuth, bismuth oxide, copper, copper oxide, iodine, zirconium, zirconium dioxide, nickel, nickel oxide, and combinations of the foregoing materials.

The heavy particulate filler may be present in an amount of about 1 wt. % to about 99.5 wt. %. In another example of this embodiment, the heavy particulate filler may be present in an amount of about 1 wt. % to about 30 wt. %. In still another example of this embodiment, the heavy particulate filler may be present in an amount of about 10 wt. % to about 30 wt. %. In still another example of this embodiment, the heavy particulate filler may be present in an amount of about 20 wt. % to about 30 wt. %.

The light particulate filler may be present in an amount of about 1 wt. % to about 99.5 wt. % based on the total weight of the composite material. The ratio of the heavy particulate filler to the light particulate filler is about 1:80 to about 99.5:1.

One method of dispensing and/or manufacturing an article such as a lead-free, non-toxic, radiation shielding device (e.g., a radiation shielding device for radioactive isotopes of Xenon, Xe-133, technetium, Tc-99m, gallium citrate, Ga-67, samarium, Sm-153, thallium chloride, or Tl-201) includes the steps of forming a lead-free composite material by combining the liquid thermosetting polymer, the heavy particulate filler, and the light particulate filler and casting the lead-free composite material to produce the desired article.

In another embodiment, the composite material comprises at least one thermosetting polymer, at least one heavy particular filler, at least one light particulate filler, and an arc resistant filler, which can also be used to manufacture any suitable article such as a lead-free, non-toxic, radiation shielding device. The thermosetting polymer is present in an amount of about 0.5 wt. % to about 50 wt. % based on the total weight of the composite material and is selected from the group consisting of epoxy resins, urethane prepolymers, phenolics, silicones, unsaturated esters, vinyl esters, and melamine. The heavy particulate filler is a metal selected from the group consisting of tungsten, osmium, uranium, iridium, platinum, gold, molybdenum, tantalum, hafnium, thallium, palladium, ruthenium, rhodium, silver, and combinations of the foregoing materials. The light particulate filler is selected from the group consisting of barium, barium sulfate, barium carbonate, barium hydroxide, barium oxide, tin, tin oxide, tin dioxide, bismuth, bismuth oxide, copper, copper oxide, iodine, zirconium, zirconium dioxide, nickel, nickel oxide, and combinations of the foregoing materials.

The heavy particulate filler may be present in an amount of about 1 wt. % to about 99.5 wt. %. In another example of this embodiment, the heavy particulate filler may be present in an amount of about 1 wt. % to about 30 wt. %. In still another example of this embodiment, the heavy particulate filler may be present in an amount of about 10 wt. % to about 30 wt. %. In still another example of this embodiment, the heavy particulate filler may be present in an amount of about 20 wt. % to about 30 wt. %.

The light particulate filler may be present in an amount of about 1 wt. % to about 99.5 wt. % based on the total weight of the composite material. The ratio of the heavy particulate filler to the light particulate filler is about 1:80 to about 99.5:1.

The arc resistant filler, which is present in an amount of about 0.5 wt. % to about 70 wt. % based on the total weight of the composite material, is a metal oxide, a metalloid oxide, a metal nitride, and/or a metalloid nitride selected from the group consisting of boron nitride, boron oxide, zinc oxide, aluminum oxide, titanium oxide, magnesium oxide, iron oxide, and combinations of the foregoing materials. The ratio of the heavy particulate filler, the light particulate filler, and the arc resistant filler is about 1:80:0.5 to about 99.5:1:60.

One method of dispensing and/or manufacturing an article such as a lead-free, non-toxic, radiation shielding device (e.g., a radiation shielding device for radioactive isotopes of Xenon, Xe-133, technetium, Tc-99m, gallium citrate, Ga-67, samarium, Sm-153, thallium chloride, or Tl-201) including the arc resistant filler includes the steps of forming a lead-free composite material by combining the liquid thermosetting polymer, the heavy particulate filler, the light particulate filler, and the arc resistant filler, and casting the lead-free composite material to produce the desired article.

In one particular embodiment, one exemplary thermosetting polymer is epoxy resin, one exemplary heavy particulate filler is tungsten in powder form, and one exemplary light particulate filler is barium sulfate in powder form. Boron nitride in powder form may be the arc resistant filler. The arc resistant filler may also be the combination of boron nitride powder and zinc oxide powder.

The amounts and ratios of heavy particulate fillers, light particulate fillers and arc resistant fillers may be modified to produce composite materials that address different levels of radiation energy shielding. Likewise, the amounts and ratios of heavy particulate fillers, light particulate fillers and arc resistant fillers may be modified to improve the ease of processing, control of viscosities, densities, inhibit tungsten powder settling, improve dielectric strength and arc resistance and increase mechanical properties such as tensile strength and flexural modulus and the like.

In any of the foregoing embodiments, the composite material may also include an additive selected from a curative, a processing aid, a functional additive, a pigment, or combinations thereof. It is contemplated that the composite material may include more than one of the above-mentioned additives. Examples of curatives include, but are not limited to metaphenlenediamine (MPDA), diethylenetriamine (available as Epikure™ 3223, from Hexion Specialty Chemicals, Columbus, Ohio, United States), a blend of polyethylenepolyamines and propoxylated polyethylenepolyamines (available as Epikure™ 3290, from Hexion Specialty Chemicals, Columbus, Ohio, United States), an amine-based adduct curing agent (available as Epikure™ W Curing Agent, from Hexion Specialty Chemicals, Columbus, Ohio, United States), 4,4' methylene-bis-(ortho-chloroaniline) (also referred to as "MBOCA" or "MOCA"), 3,5-dimethylthio-toluylenediamine (available under the trade name Ethacure 300, from Albemarle Corporation, Baton Rouge, La., United States), and the like.

Examples of processing aids include, but are not limited to anti-foaming agents such as a silicone defoamer available as Antifoam 41-B, from Synalloy Corp., Cleveland, Tenn., United States. Examples of processing aids also include plasticizers, which may reduce viscosity to allow for easier processing and molding.

Examples of functional additives include, but are not limited to flame retardants, UV stabilizers and anti-fouling agents. Functional additives may also include fumed silica, which may be used as a viscosity modifier or rheological property modifier. Fumed silica is available as CAB-O-SIL® TS-720 and CAB-O-SIL® M-5, from Cabot Corporation, Boston, Mass., United States.

Typically, the additives are present in the composite material in an amount between 0.1% and about 20% by weight, based on the weight of the composite material. In one example, the additives are present in the composite material in an amount between 0.5% to about 20% by weight, based on the weight of the composite material. In still another example, the additives are presented in an amount between about 1% and about 20% by weight based on the weight of the composite material. In a further example, the additives are present in an amount between about 5% and about 12% by weight, based on the weight of the composite material. In still a further example, the additives are present in an amount between about 7% and about 10% by weight, based on the weight of the composite material. In yet a further example, the additives are present in an amount between about 8% and about 10% by weight, based on the weight of the composite material. In still another example, the additives are present in an amount between about 8% and about 12% by weight, based on the weight of the composite material. In yet a further example, the additives are present in an amount between about 8% and about 20% by weight, based on the weight of the composite material. In another example, the additives are present in an amount between about 7% and about 20% by weight, based on the weight of the composite material.

One or more curatives may be present in the composite material in an amount between about 0.1% and about 20% by weight, based on the weight of the composite material. In one example, the curatives may be present in the composite material in an amount between about 0.5% and about 10% by weight, based on the weight of the composite material. In yet another example, the curatives may be present in the composite material in an amount between about 1% and about 5% by weight, based on the weight of the composite material. In a further example, the curatives may be present in the composite material in an amount between about 2% and about 5% by weight, based on the weight of the composite material. In yet a further example, the curatives may be present in the composite material in an amount between about 2% and about 4% by weight, based on the weight of the composite material.

One or more pigments may be present in the composite material in an amount between about 0.5% and about 5% by weight, based on the weight of the composite material. In one example, pigments may be present in the composite material in an amount between about 1% and about 5% by weight, based on the weight of the composite material. In yet another example, pigments may be present in the composite material in an amount between about 2% and about 5% by weight, based on the weight of the composite material. In a further example, pigments may be present in the composite material in an amount between about 2% and 3.0% by weight, based on the weight of the composite material. In yet a further example, pigments may be present in the composite material in an amount between about 2.0% and 3.0% by weight, based on the weight of the composite material. In yet another example, pigments may be present in the composite material in an amount between about 2% and 2.5% by weight, based on the weight of the composite material.

Anti-foaming agents may be added to the composite material in an amount between 0% and 5% by weight, based on the weight of the composite material. In one example, anti-foaming agents are present in the composite material in an amount between 0% and 5% by weight, based on the weight of the composite material. In another example, the anti-foaming agents are present in the composite material in an amount between 0% and 1% by weight, based on the weight of the composite material. However, the anti-foaming agents are usually added to the composite material in a drop-wise manner. In one example, between zero and five (0-5) drops of anti-foaming agent are added to the composite material. In another example, use between three and five (3-5) drops of anti-foaming agent is added to the composite material. In another example, 3 drops of anti-foaming agent are added to the composite material.

Various articles may be manufactured with the above-described composite material. For instance, radiation shielding articles may be manufactured from the composite materials. Examples of articles include, but are not limited to, body shielding, reactor shielding, ion implantation machine source insulators, X-ray and gamma-ray tube housings, radioisotope housings, syringe housings for radiation shield applications, and the like. The composite material disclosed herein may also be used for ballast and other weight/balancing applications as well as for energy storage. Moreover, the composite material may be used as layers or coatings on articles used in radiation shielding. The composite material may also be used to manufacture casings, containers, laminates, and other types of articles.

An article, such as a radiation shielding device, a ballast article, a weight-balancing article, or an energy storage article, may be manufactured by combining a thermosetting polymer in a liquid form with a filler selected from a heavy particulate filler, a light particulate filler, or a combination thereof, to form a composite material. In one example, if more than one filler is included in the composite material, the fillers are dry-blended and mixed prior to being mixed with a liquid thermosetting polymer. The composite material is in a liquid form and able to be poured or cast to form the desired article, such as a radiation shielding device.

Casting is a method that involves, inter alia, combining specific components in certain amounts to form a desired liquid material and pouring the liquid material, such as the disclosed composite material, into a mold to form an article. Logos and identification markings may be embedded into the article either during or after the casting process.

In one example of casting a composite material, the thermo-setting polymer is pre-heated to a temperature between 150° Fahrenheit to 250° Fahrenheit, a curative is melted in an oven set at a temperature between 170° Fahrenheit to 190° Fahrenheit, and one or more fillers are mixed with the thermosetting polymer until a uniform mixture is obtained. Once a uniform mixture is obtained, it is de-gassed for one to five minutes by adding anti-foam agent. One or more curatives are added to the mixture and the mixture is then de-gassed for a time period between thirty seconds and five minutes. The temperature of the mixture should be maintained between 130° Fahrenheit to 230° Fahrenheit. The mixture is then cast into the mold, which is pre-heated in an oven having a temperature between 150° Fahrenheit to 250° Fahrenheit. The mixture is cured for a time period between thirty and 180 minutes, after which it is de-molded and allowed to post-cure. Post cure may be between 1 and 20 hours at a temperature between 150° Fahrenheit to 300° Fahrenheit. The parameters of the casting process may vary between different composite materials.

Alternatively, an article, such as a radiation shielding device, a ballast article, a weight-balancing article, or an energy storage article, may be manufactured by combining a thermosetting polymer in a solid form with a filler selected from a heavy particulate filler, a light particulate filler, or a combination thereof, to form a composite material. The composite material is in a solid form. The solid composite material is subjected to liquid phase sintering to form an article, such as a radiation shielding device. Liquid phase sintering involves melting the solid composite material and then subjecting the composite material to a normal cure reaction process. Specifically, liquid phase sintering occurs when the thermosetting polymer together with the curatives, processing agents and fillers are used in powdered form, are mixed or blended at ambient temperature, transferred to a preheated mold and cured under pressure. The mold temperature is set above the melting temperatures for all of the components (excluding the fillers) while allowing the chemical reaction/curing reaction to take place. The temperature is set around between 150 degrees Fahrenheit (150° F.) to 300 degrees Fahrenheit (300° F.) for 30 to 180 minutes in order to complete the chemical reaction/curing reaction, however, it is contemplated that the temperature and length of time can vary.

In one example, a non-castable composite material is used to manufacture a lead-free, non-toxic article by pre-heating a mold to a temperature between 230° Fahrenheit to 250° Fahrenheit. A solid thermo-setting polymer is mixed with a solid curative. In a composite material including two or more fillers, the fillers are combining in a separate container and mixed until uniform. The filler (or the mixture of the fillers) is then combined with the thermo-setting polymer and curative until a uniform mixture is obtained. The combining and mixing of the fillers with the thermo-setting polymer and curative may be done in a seal chamber. Once in a uniform state, the mixture is pre-heated in a press to a temperature between 150° Fahrenheit to 250° Fahrenheit. Liquid phase sintering is conducted for a time between thirty and sixty minutes, after which the mixture is de-molded and allowed to post-cure. Post cure can occur for a time period between one and sixteen hours at a temperature between 230° Fahrenheit to 300° Fahrenheit. Other parameters may be employed based on the composite material used.

The following are representative examples of composite materials as described herein. Unless otherwise noted, amounts given are in weight percent (% wt.).

EXAMPLES

TABLE 1

Composite Materials

| Example | Thermosetting Polymer | Heavy Particulate Filler | Light Particulate Filler | Additives | Specific Gravity |
|---|---|---|---|---|---|
| 1 | Liquid Epoxy Resin 10-30% wt. | Tungsten powder 5-30% wt | Barium sulfate 40-70% wt. | Curatives, processing aids, functional additives and/or pigments 0.1-20% wt. | 1.5-3.0 |
| 2 | Liquid Epoxy Resin 5-20% wt. | Tungsten powder 10-95% wt. | Barium sulfate 5-70% wt | Curatives, processing aids, functional additives and/or pigments 0.1-20% wt. | 3.0-7.0 |
| 3 | Liquid Epoxy Resin 5-30% wt. | Tungsten 10-95% wt. | Barium sulfate 10-70% wt. | Curatives, processing aids, functional additives and/or pigments 0.1-20% wt. | 2.5-6.0 |
| 4 | Solid Epoxy Resin 0.5-30% wt. | tungsten 5-90% wt | Barium sulfate 10-30% wt. | Curatives, processing aids, functional additives and/or pigments 0.1-20% wt. | 2.0-4.5 |
| 5 | Solid Epoxy Resin 0.5-20% wt. | Tungsten powder 70-99.5% wt. | Barium sulfate 1-30% wt. | Curatives, processing aids, functional additives and/or pigments 0.1-20% wt. | 4.5-12 |
| 6 | Solid Epoxy Resin 0.5-30% wt. | Tungsten powder 1-99.5% wt. | Barium sulfate 5-99.5% wt. | Curatives, processing aids, functional additives and/or pigments 0.1-20% wt. | 2.5-12 |
| 7 | Liquid Urethane Prepolymer 10-40% wt. | Tungsten powder 10-80% wt. | Barium sulfate 5-70% | Curatives, processing aids, functional additives and/or pigments 0.1-20% wt. | 2.5-4.5 |
| 8 | Liquid Urethane Prepolymer 10-40% wt. | Tungsten powder 10-70% wt | Barium sulfate 5-70% wt. | Curatives, processing aids, functional additives and/or pigments 0.1-20% wt. | 2.0-3.5 |
| 9 | Liquid Urethane Prepolymer 10-20% wt. | Tungsten powder 5-80% wt. | Barium sulfate 5-70% wt. | Curatives, processing aids, functional additives and/or pigments 0.1-20% wt. | 2.0-4.5 |
| 10 | Liquid Urethane Prepolymer 10-20% wt. | Tungsten powder 10-70% wt | Stainless steel powder 40-80% wt. | Curatives, processing aids, functional additives and/or pigments 0.1-20% wt. | 2.0-4.5 |
| 11 | Liquid Epoxy Resin 10-20% wt. | Tungsten powder 20-70% wt | Stainless steel powder 50-80% wt. | Curatives, processing aids, functional additives and/or pigments 0.1-20% wt. | 3.0-5.0 |

Example 12

A composite material having the following components is made (4210-d26) according to casting processes disclosed herein:
 21.75% Epon™ 8280 epoxy resin, available from Hexion
 3.25% MPDA curative, available from DuPont
 75.0% CIMBAR XF barium sulfate, available from Potters Industries Inc., Malvern, Pa., United States
 3 to 5 drops of anti-foaming agent The composite material yields a density of 2.6 grams per cubic centimeter and absorbs or blocks 41.3% of X-ray radiation energy exposed to a 140 kVp X-ray radiation source. A pure lead material having an identical thickness absorbs or blocks 96.3% of X-ray radiation at 140 kVp X-ray radiation source.

The composite material has the following properties:
 95 D hardness
 0.4 ft-lb/in notched izod impact strength
 4190 psi tensile strength
 0.5% elongation
 9190 psi flexural strength
 1340 ksi flexural modulus
 $7.1 \times 10^{15}$ ohm-cm volume resistivity
 0.449 W/m k thermal conductivity
 5.86 dielectric constant
 384 V/mil dielectric strength This example shows that barium sulfate has excellent dielectric strength but poor X-ray radiation shielding capability when being tested at a 140 kVp X-ray radiation source.

Example 13

A lead & lead tetraoxide filled epoxy resin based composite material is made (4910-90D HD) by a liquid casting process. The composite material has a specific gravity of 4.29 and it is commercially available. The composite material has the following properties:
- 95 D hardness
- 0.46 ft-lb/in notched izod impact strength
- 4500 psi tensile strength
- 1.0% elongation
- 9190 psi flexural strength
- 1340 ksi flexural modulus
- 10^15 ohm-cm volume resistivity
- 0.5567 W/mk thermal conductivity
- 6.4 dielectric constant
- 215 V/mil dielectric strength
- 78 seconds arc resistance This composite material absorbs or blocks approximately about 94.0% to about 96.0% X-ray radiation energy with a test sheet thickness of 0.25 inch when being tested at a 76 kVp X-ray radiation source.

Example 14

A composite material having the following components is made (4210-d35, Lot #081009-01) according to casting processes disclosed herein:
- 50.0% 1.57 micron tungsten powder, available as C6-649 from Buffalo Tungsten Inc., Depew, N.Y., United States.
- 18.7% Epon™ 8280 epoxy resin, available from Hexion
- 2.8% MPDA curative, available from DuPont
- 27.5% 200 barium sulfate available from Potters Industries Inc.
- 3 to 5 drops of anti-foaming agent The composite material yields a density of 3.635 grams per cubic centimeter and absorbs or blocks approximately about 94.0% X-ray radiation energy, which has a similar radiation shielding performance as lead & lead tetraoxide filled composite materials in Example 13. When being tested for X-ray radiation shielding, both composite materials were identical in thickness (0.25 inch) and exposed to a 76 kVp X-ray radiation source. However, this composite material has 23 second arc resistance tested according to ASTM D-495 & UL 746A. The arc resistance is much lower than that of the composite material in Example 13. Thus, improvement of arc resistance is necessary.

Example 15

A composite material having the following components is made (4210-d35, Lot #080609-01) according to casting processes disclosed herein to improve arc resistance:
- 39.02% 3.62 micron tungsten powder, available as WS-139 from Buffalo Tungsten Inc., Depew, N.Y., United States.
- 18.88% Epon™ 8280 epoxy resin, available from Hexion
- 2.57% MPDA curative, available from DuPont
- 21.95% barium sulfate 200 available from Potters Industries Inc.
- 17.56% zinc oxide Cerox-506, available from Horsehead Corp., Monaca, Pa.
- 3 to 5 drops of anti-foaming agent The composite material yields a density of 3.4 grams per cubic centimeter and absorbs or blocks approximately about 94.0% X-ray radiation energy when exposed to a 76 kVp X-ray radiation source, which is the same as that of the composite material in Example 14, but has 146 seconds arc resistance tested according to ASTM D-495 & UL 746A. In comparison with the composite material in Example 14, the arc resistance has been improved by approximately 535% at approximately the same specific gravity. The arc resistance of the composite material in Example 15 is also much better than that in Example 13, about 87% better.

Example 16

A composite material having the following components is made (4210-d35, Lot #080609-02) according to casting processes disclosed herein further to improve arc resistance:
- 40% 3.62 micron tungsten powder, available as WS-139 from Buffalo Tungsten Inc., Depew, N.Y., United States.
- 18.5% Epon™ 8280 epoxy resin, available from Hexion
- 2.5% MPDA curative, available from DuPont
- 22% barium sulfate 200 available from Potters Industries Inc.
- 14.5% 2 micron zinc oxide Cerox-506, available from Horsehead Corp., Monaca, Pa.
- 2.5% 3-5 micron boron nitride Grade ZG, available from ZYP Coatings, oak Ridge, Tenn.
- 3 to 5 drops of anti-foaming agent The composite material yields a density of 3.4 grams per cubic centimeter and absorbs or blocks approximately about 94.0% X-ray radiation energy when exposed to a 76 kVp X-ray radiation source, which is the same as that of the composite material in Example 14, but has 182 seconds of arc resistance according to ASTM D-495 & UL 746A. This composite material, when compared with the composite material in Example 14, has improved arc resistance of approximately 691%. When compared with the lead & lead tetraoxide filled composite material in Example 13, the arc resistance improved by about 133%. Furthermore, substituting 2.5 wt % zinc oxide powder by boron nitride powder from Example 15 further improves electric arc resistance of the composite material by about 25%.

Example 17

A composite material having the following components is made (4210-d35, Lot #082709-02) according to casting processes disclosed herein further to improve arc resistance:
- 50% 3.62 micron tungsten powder, available as WS-139 from Buffalo Tungsten Inc., Depew, N.Y., United States.
- 18.7% Epon™ 8280 epoxy resin, available from Hexion
- 2.8% MPDA curative, available from DuPont
- 10% barium sulfate 200 available from Potters Industries Inc.
- 15% 2 micron zinc oxide Cerox-506, available from Horsehead Corp., Monaca, Pa.
- 2.5% 3-5 micron boron nitride Grade ZG, available from ZYP Coatings, oak Ridge, Tenn.
- 3 to 5 drops of anti-foaming agent The composite material yields a density of 3.645 grams per cubic centimeter and absorbs or blocks approximately about 92.0% X-ray radiation energy when exposed to a 140 kVp X-ray radiation source, which is the same as that of the composite material in Example 14, but has 172 seconds arc resistance tested according to ASTM D-495 & UL 746A. This composite material, when compared with the composite material in Example 14, has improved arc resistance by about 648%. When compared with the lead & lead tetraoxide filled composite material in Example 13, the arc resistance improved by about 120%.

Absorption (or blockage) of X-ray radiation is determined by targeting an X-ray beam at the material, which is placed approximately fifty (50) inches away from the source of the X-ray radiation. X-ray film is placed underneath the material being tested. X-ray radiation not absorbed or blocked by the material is measured on the X-ray film.

As was discovered in the invention two composite materials having a same specific gravity may have equivalent radiation shielding performance when exposed to a relatively low radiation energy level, for example, a 76 kVp X-ray radiation source. However, they may show different radiation shielding performances at relatively high radiation energy levels, for instance, a 140 kVp X-ray radiation source. This is because the two composite materials may be comprised of different types of fillers, different particles, different filler ratios (if more than one type of fillers is used), and different chemical treatment of fillers.

Example 18

A composite material is made with the following components according to liquid phase sintering processes disclosed herein:
- 96.0% 1.38 micron tungsten powder, C5-531, available from Buffalo Tungsten Inc.
- 3.8% Epon™ 3002 solid epoxy resin, available from Hexion
- 0.2% MPDA curative, available from DuPont The composite material yields a density of 10.1 grams per cubic centimeter.

Unless otherwise specified, all ranges disclosed herein are inclusive and combinable at the end points and all intermediate points therein. The terms "first," "second," "third" and the like, herein do not denote any order, sequence, quantity, or importance, but rather are used to distinguish one element from another. The terms "a" and "an" herein do not denote a limitation of quantity, but rather denote the presence of at least one of the referenced item. All numerals modified by "about" are inclusive of the precise numeric value unless otherwise specified.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A lead-free, non-toxic composite material, the composite material comprising:
   a thermosetting polymer;
   a heavy particulate filler comprising a metal having an average particle size in a range between above 0.1 micron and 15 microns, the heavy particulate filler selected from a group consisting of tungsten, osmium, uranium, iridium, platinum, gold, molybdenum, tantalum, hafnium, thallium, palladium, ruthenium, rhodium, silver and combinations thereof; and
   a light particulate filler having an average particle size in a range between above 0.1 micron and 15 microns, the light particulate filler selected from a group consisting of barium, barium sulfate, barium carbonate, barium hydroxide, barium oxide, tin, tin oxide, tin dioxide, bismuth, bismuth oxide, copper, copper oxide, iodine, zirconium, zirconium dioxide, nickel, nickel oxide and combinations thereof, wherein the light particulate filler has a specific gravity that is less than a specific gravity of the heavy particulate filler.

2. The lead-free, non-toxic composite material of claim 1, wherein a weight ratio of the heavy particulate filler to the light particulate filler is in a range from about 1:90 to about 99.5:1.

3. The lead-free, non-toxic composite material of claim 1, further comprising an additive selected from a group consisting of curatives, processing aids, functional additives, pigments, and combinations thereof.

4. The lead-free, non-toxic composite material according to claim 1, wherein the light particulate filler is present in an amount between about 1 wt. % to about 30 wt. % based on the total weight of the composite material.

5. The lead-free, non-toxic composite material of claim 1, wherein the thermosetting polymer is an epoxy resin.

6. The lead-free, non-toxic composite material of claim 5, wherein the epoxy resin is present in an amount between about 0.5% to about 50% by weight, based on the total weight of the composite material.

7. The lead-free, non-toxic composite material of claim 1, wherein the light particulate filler is barium sulfate.

8. The lead-free, non-toxic composite material of claim 7, wherein the barium sulfate is present in an amount between about 1 wt. % to about 99.5 wt. % based on the total weight of the composite material.

9. The lead-free, non-toxic composite material of claim 1, wherein the heavy particulate filler is tungsten.

10. The lead-free, non-toxic composite material of claim 9, wherein the tungsten is present in an amount of about 1 wt. % to about 99.5 wt. % of the total weight of the composite material.

11. The lead-free, non-toxic composite material of claim 9, wherein the tungsten is present in an amount of about 1 wt. % to about 30 wt. % of the total weight of the composite material.

12. A lead-free, non-toxic composite material, the composite material comprising:
   a thermosetting polymer;
   a heavy particulate filler comprising a metal having an average particle size in a range between above 0.1 micron and 15 microns;
   a light particulate filler having an average particle size in a range between above 0.1 micron and 15 microns, the light particulate filler having a specific gravity that is less than a specific gravity of the heavy particulate filler; and
   an arc resistant filler comprising at least one of a metal nitride, a metalloid nitride, a metal oxide and a metalloid oxide.

13. The lead-free, non-toxic composite material of claim 12, wherein the thermosetting polymer is an epoxy resin present in an amount between about 0.5% to about 50% by weight, based on the total weight of the composite material.

14. The lead-free, non-toxic composite material of claim 12, wherein the light particulate filler is barium sulfate.

15. The lead-free, non-toxic composite material according to claim 12, wherein the light particulate filler is present in an amount between about 1 wt. % to about 30 wt. % based on the total weight of the composite material.

16. The lead-free, non-toxic composite material of claim 12, wherein the arc resistant filler is selected from the group consisting of boron nitride, boron oxide, zinc oxide, aluminum oxide, titanium oxide, magnesium oxide, iron oxide, and combinations of the foregoing materials.

17. The lead-free, non-toxic composite material of claim 16, wherein the arc resistant filler is present in an amount of about 0.5 wt. % to about 70 wt. % based on the total weight of the composite material.

18. The lead-free, non-toxic composite material of claim 12, wherein the heavy particulate filler is tungsten.

19. The lead-free, non-toxic composite material of claim 18, wherein the tungsten is present in an amount of about 1 wt. % to about 99.5 wt. % of the total weight of the composite material.

20. The lead-free, non-toxic composite material of claim 18, wherein the tungsten is present in an amount of about 1 wt. % to about 30 wt. % of the total weight of the composite material.

21. A lead-free, non-toxic composite material, the composite material comprising:
   an epoxy resin;
   a heavy particulate filler having an average particle size in a range between above 0.1 micron and 15 microns, the heavy particulate filler comprising tungsten;
   a light particulate filler having an average particle size in a range between above 0.1 micron and 15 microns, the light particulate filler comprising barium sulfate; and
   an arc resistant filler comprising at least one of a metal nitride, a metalloid nitride, a metal oxide, and a metalloid oxide.

22. The lead-free, non-toxic composite material according to claim 21, wherein the light particulate filler is present in an amount between about 1 wt. % to about 30 wt. % based on the total weight of the composite material.

23. The lead-free, non-toxic composite material of claim 21, wherein the epoxy resin is present in an amount between about 0.5% to about 50% by weight, based on the total weight of the composite material.

24. The lead-free, non-toxic composite material of claim 23, wherein the tungsten is present in an amount of about 1 wt. % to about 30 wt. % of the total weight of the composite material.

25. The lead-free, non-toxic composite material of claim 24, wherein the barium sulfate is present in an amount of about 1% to about 99.5% by weight, based on the total weight of the composite material.

26. The lead-free, non-toxic composite material of claim 25, wherein the arc resistant filler is boron nitride powder present in an amount of about 0.5% to about 70% by weight, based on the total weight of the composite material.

27. The lead-free, non-toxic composite material of claim 25, wherein the arc resistant filler is boron nitride powder and zinc oxide powder, present in an amount of about 0.5% to about 70% by weight, based on the total weight of the composite material.

28. A lead-free, non-toxic composite material, the composite material comprising:
   a thermosetting polymer;
   a heavy particulate filler comprising a metal having an average particle size in a range between 0.5 micron and 15 microns, the heavy particulate filler selected from a group consisting of tungsten, osmium, uranium, iridium, platinum, gold, molybdenum, tantalum, hafnium, thallium, palladium, ruthenium, rhodium, silver and combinations thereof; and
   a light particulate filler having an average particle size in a range between 0.5 micron and 15 microns, the light particulate filler selected from a group consisting of barium, barium sulfate, barium carbonate, barium hydroxide, barium oxide, tin, tin oxide, tin dioxide, bismuth, bismuth oxide, copper, copper oxide, iodine, zirconium, zirconium dioxide, nickel, nickel oxide and combinations thereof, wherein the light particulate filler has a specific gravity that is less than a specific gravity of the heavy particulate filler.

29. A lead-free, non-toxic composite material, the composite material comprising:
   a thermosetting polymer;
   a heavy particulate filler comprising a metal having an average particle size in a range between 0.5 micron and 15 microns;
   a light particulate filler having an average particle size in a range between 0.5 micron and 15 microns, the light particulate filler having a specific gravity that is less than a specific gravity of the heavy particulate filler; and
   an arc resistant filler comprising at least one of a metal nitride, a metalloid nitride, a metal oxide and a metalloid oxide.

30. A lead-free, non-toxic composite material, the composite material comprising:
   an epoxy resin;
   a heavy particulate filler having an average particle size in a range between 0.5 micron and 15 microns, the heavy particulate filler comprising tungsten;
   a light particulate filler having an average particle size in a range between 0.5 micron and 15 microns, the light particulate filler comprising barium sulfate; and
   an arc resistant filler comprising at least one of a metal nitride, a metalloid nitride, a metal oxide, and a metalloid oxide.

* * * * *